Sept. 28, 1971          G. R. BARGSTEDT ET AL          3,608,391
                STEPPING GEAR HAVING A VARIABLE SPEED RATIO
Filed Sept. 18, 1969                                    10 Sheets-Sheet 1

Inventor:
Gerd Rudolf Bargsted

Inventor:
Gerd Rudolf Bargsted

Inventor:
Gerd Rudolf Bargsted

Inventor:
Gerd Rudolf Bargsted

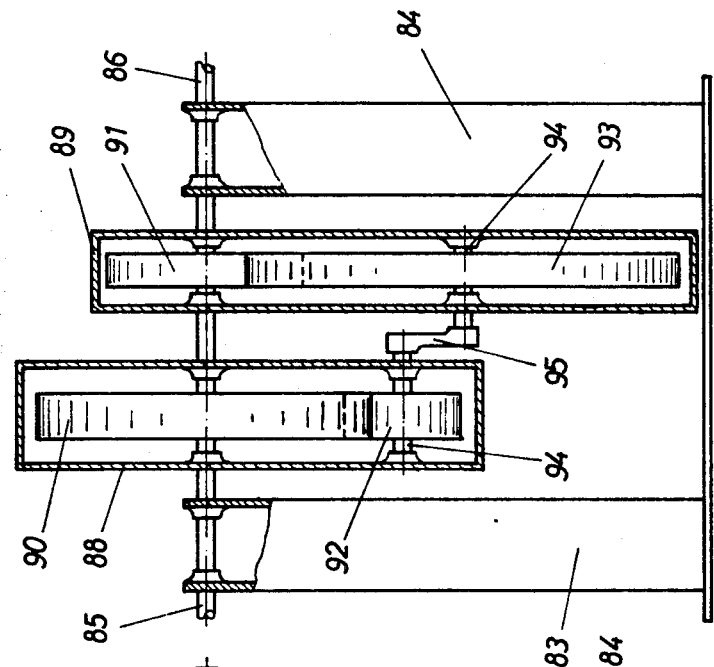
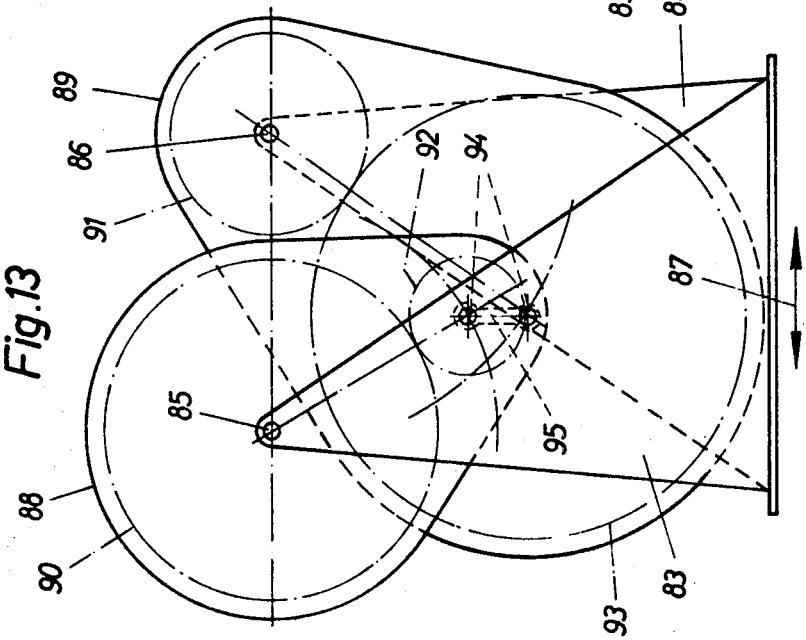

Inventor:
Gerd Rudolf Bargsted

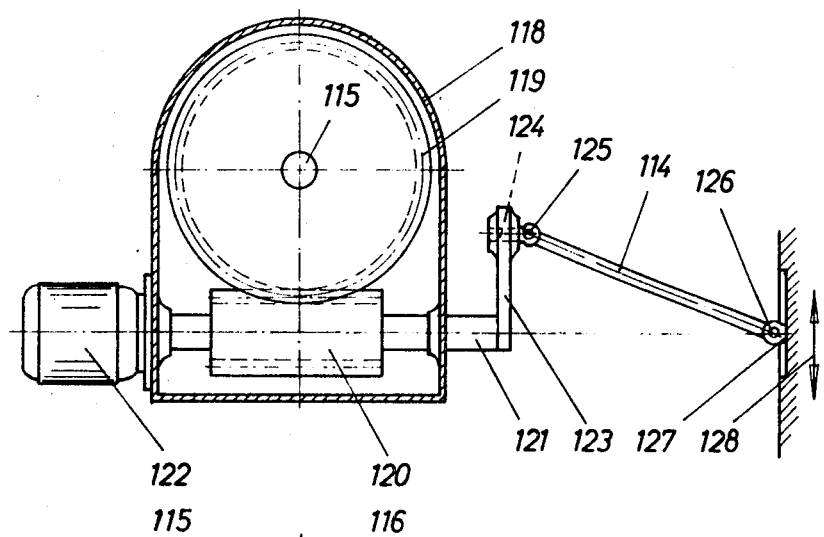
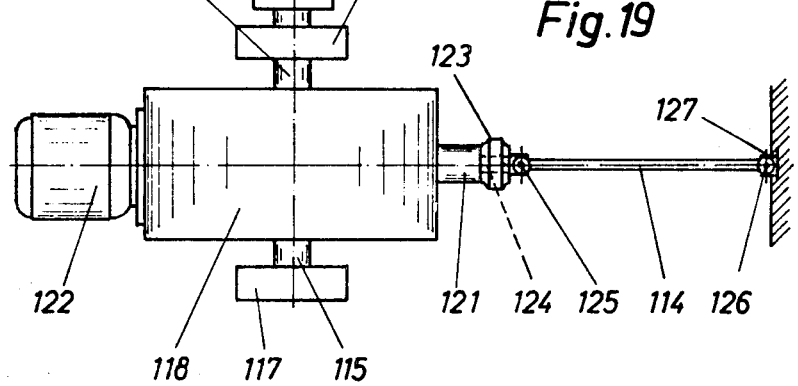

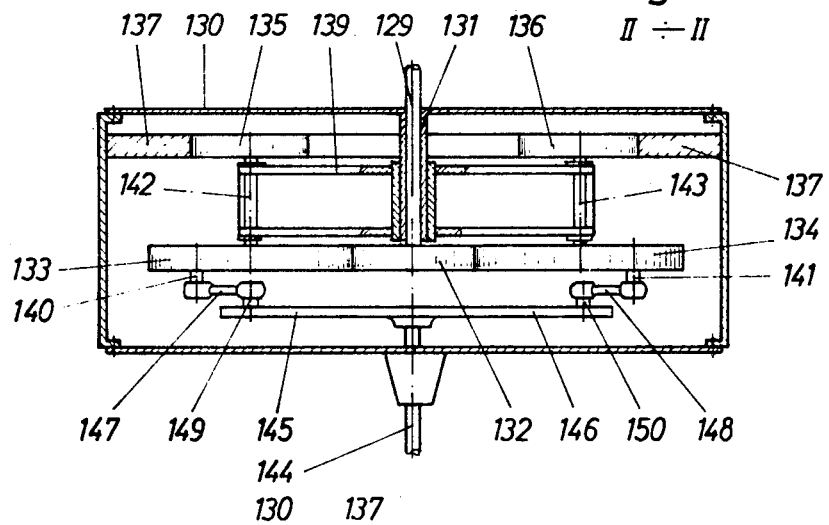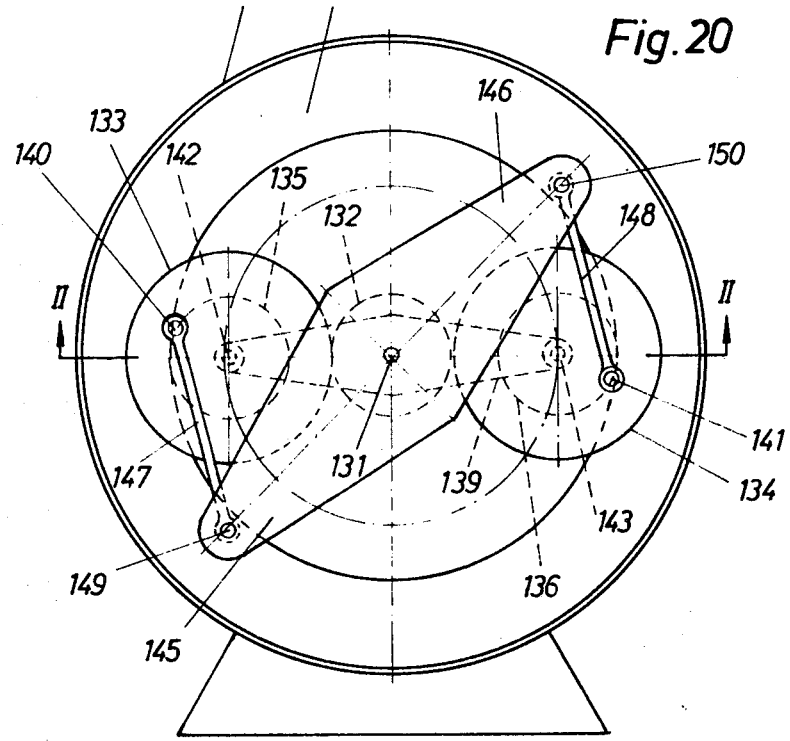

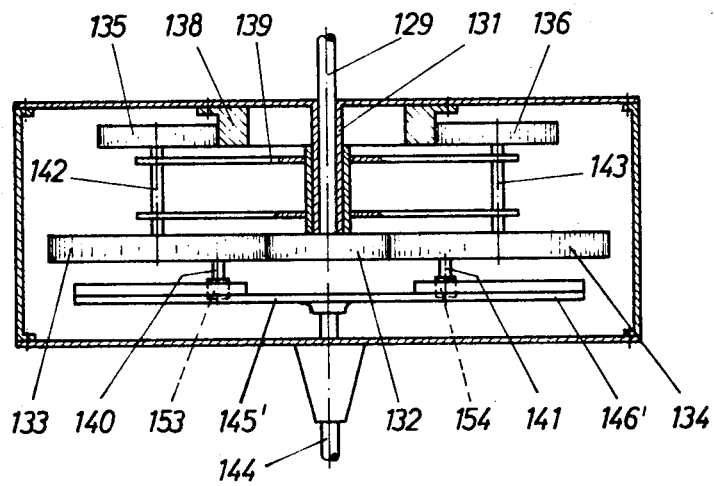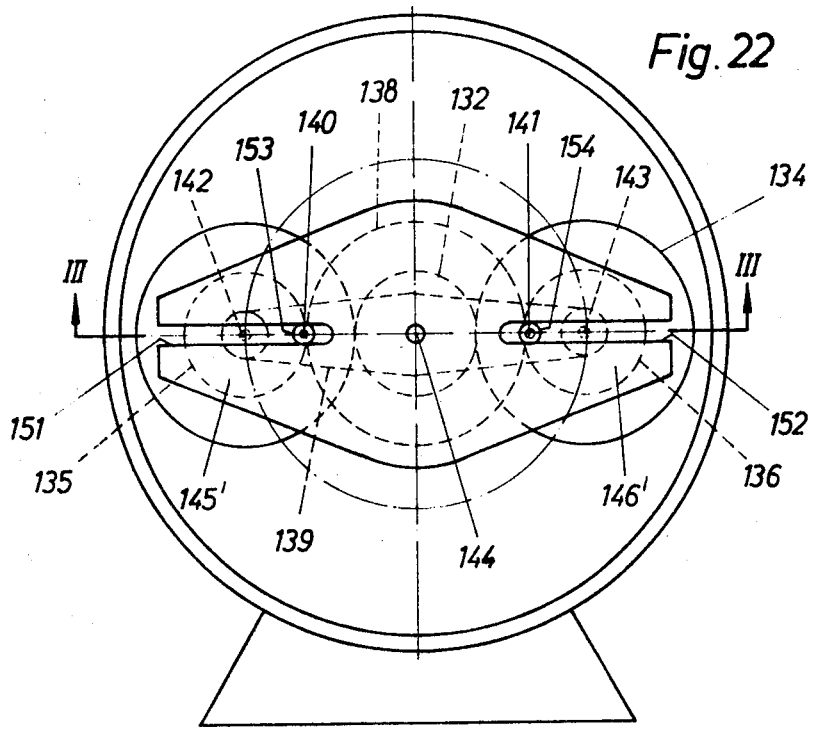

United States Patent Office 3,608,391
Patented Sept. 28, 1971

3,608,391
STEPPING GEAR HAVING A VARIABLE SPEED RATIO
Gerd Rudolf Bargstedt, 2161 Drochtersen-Wischhafenersand, Germany
Filed Sept. 18, 1969, Ser. No. 859,115
Claims priority, application Germany, Sept. 18, 1968,
P 17 75 744.7; July 3, 1969, P 19 33 721.4
Int. Cl. F16h 35/02, 37/12
U.S. Cl. 74—394        6 Claims

ABSTRACT OF THE DISCLOSURE

A stepping gear having a driving and a driven shaft with gear means therebetween, wherein at least one of the two said shafts is located in stationary bearings and one of the shafts is formed as or connected to a crank and wherein during rotation of the driving shaft a part of the gear means is adapted to be reciprocable, pivotable or rotatable in dependence upon the crank about the axle of another interconnected gear means, the rotation of the driven shaft being accelerated, decelerated or reversed thereby.

---

Figure 1:
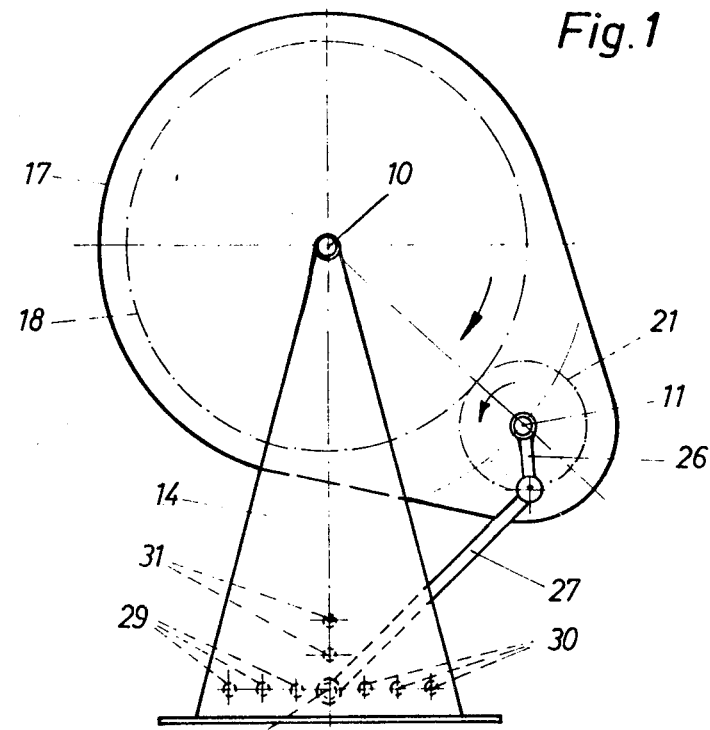

The present invention relates to a stepping or undulating motion gear having gear means such as gear wheels, friction wheels, chain wheels, pulleys incorporated between a driving and a driven shaft in torque transmission connection.

It is an object of the invention to provide a stepping gear the gear means of which remain in constant engagement and which is easily adjustable to provide various speed characteristics. Thus, for setting a new speed characteristic it may be unnecessary to change driving and/or driven members (gears or pulleys).

A further object is to provide a stepping gear to provide both acceleration and deceleration.

Furthermore the stepping gear provides acceleration and deceleration characteristics, changeable in a series of steps.

In accordance with the invention a stepping gear with a gear means having a torque transmission connection between a driving and driven shaft is characterised by the feature that at least one of the functional shafts (driving and driven shaft) are located in bearings and one of these shafts being formed as a crank or connected directly or indirectly to a crank and that with the rotation of the driving shaft a proportion of the gear means such as gear wheels, friction wheels, chain wheels, pulleys co-operating with one another are reciprocable, pivotal or rotatable in dependence upon the crank about the axle of another meshing gear means, and the rotation of the driven shaft thereby accordingly accelerated or decelerated and possibly in the relative movement being reversably moved.

The driving shaft may be provided with a crank arm which may be provided on a crank rod mounted with its other end rotatable about a fixed bearing or by means of an additional adjusting motor, such as a motor having a rotating crank arm, pressure medium cylinder mounted reciprocably, being provided within or externally of the gear.

To change the gearing characteristic, the bearing of the crank rod may be locationally variable and/or the pivotal or reciprocable and/or interchangeable crank rod and/or crank arm be variable in length. Moreover each crank with its free end may be forcibly guided in straight or curved guides extending at right angles to the functional shafts or at an angle to the vertical. This provides additional possibilities of variation even over short distances of movement.

A stepping gear adapted in accordance with the invention permits a plurality of different movement actions (gear-characteristics), the adjustment of the required movement action being relatively simple. A particularly favourable feature is that without arresting gear components a movement-standstill and a reversal movement is possible in a simple manner.

A further advantage is that the gear means transmitting the torque are constantly in connection, thus constantly forming a torque transmitting connection. By compulsory crank guidance in inclined and/or arcuate guide a movement course is also possible which deviates from a surging and falling movement within a period.

Figure 2:
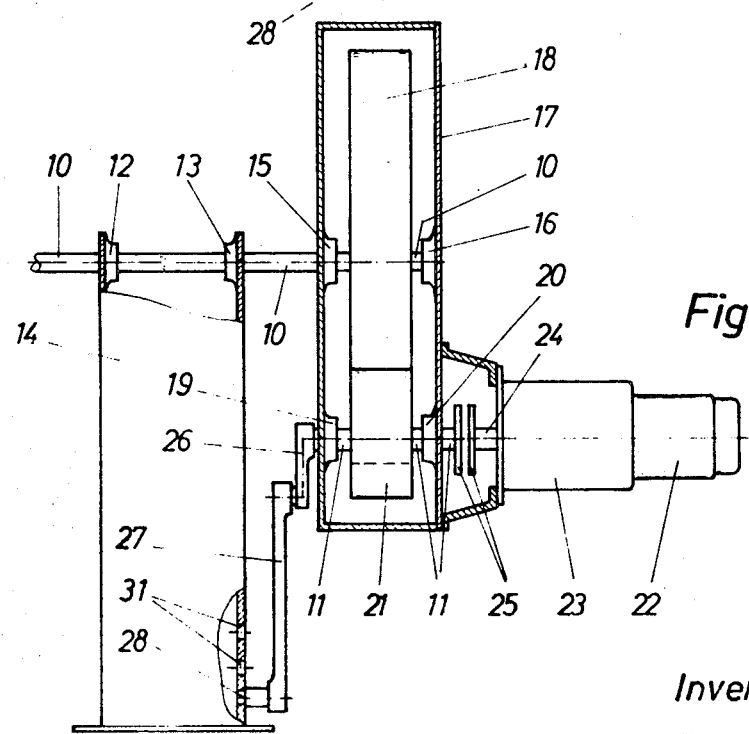
Figure 3:
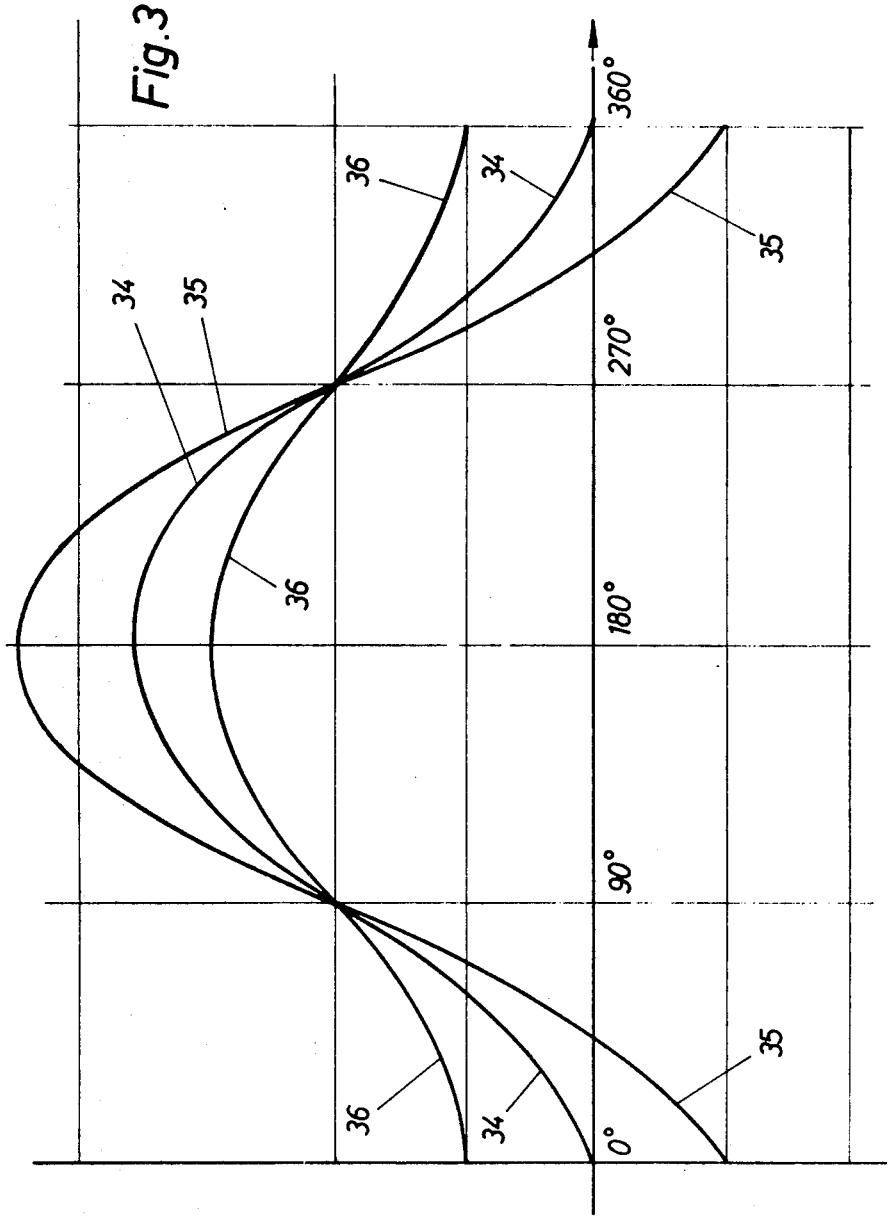
Figure 4:
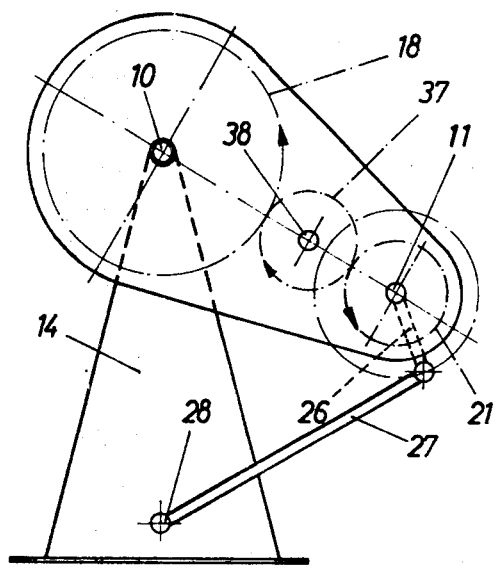
Figure 5:
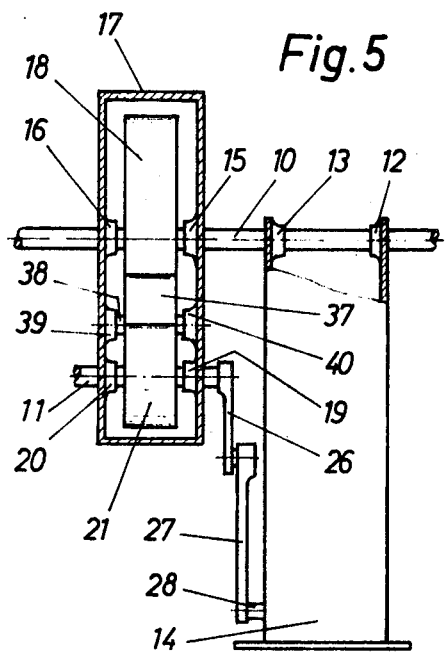
Figure 6:
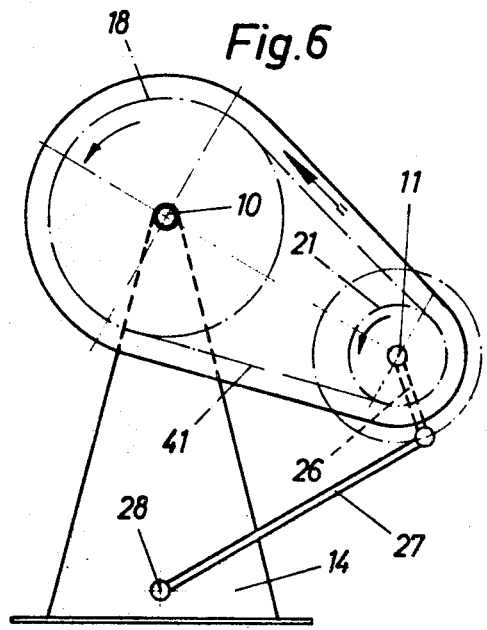
Figure 7:
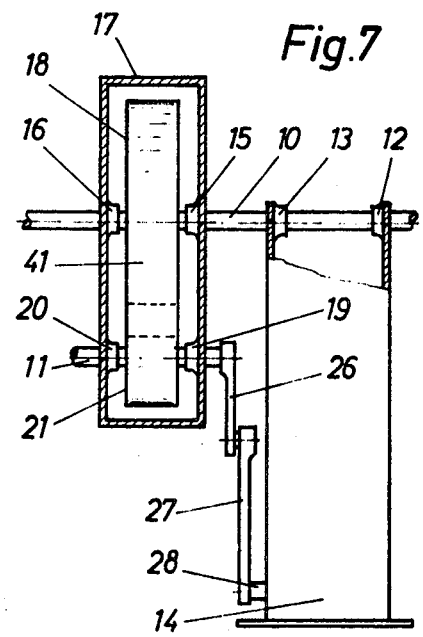
Figure 8:
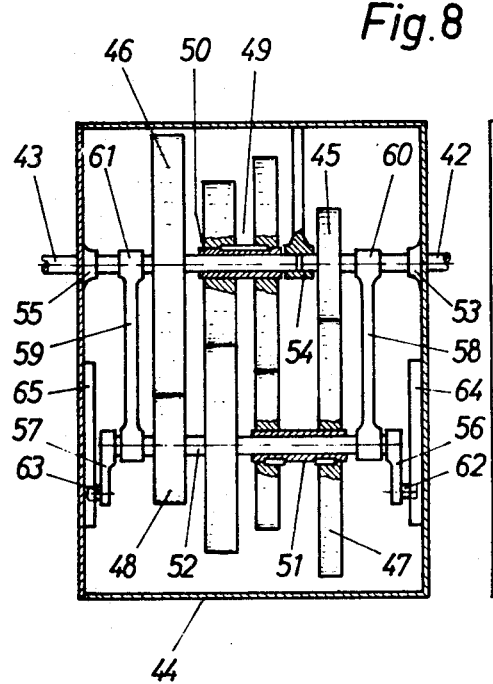
Figure 9:
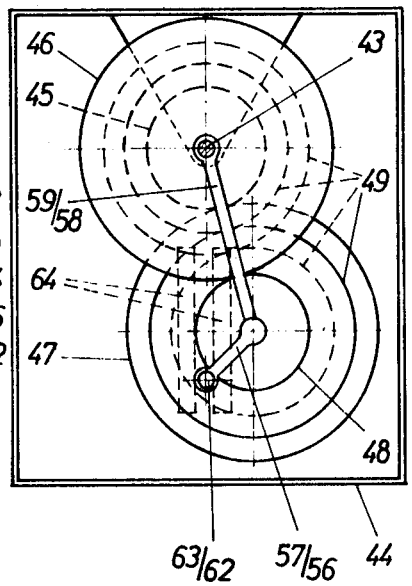
Figure 10:
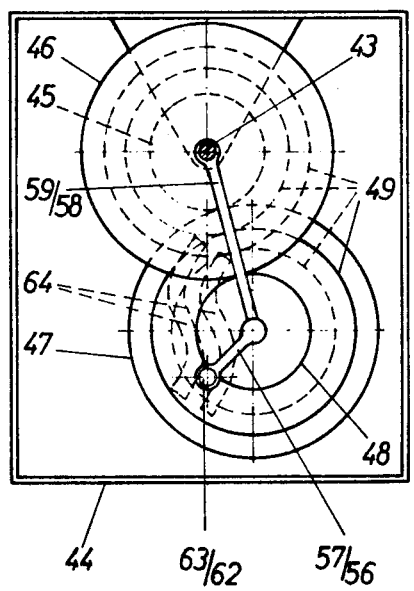
Figure 12:
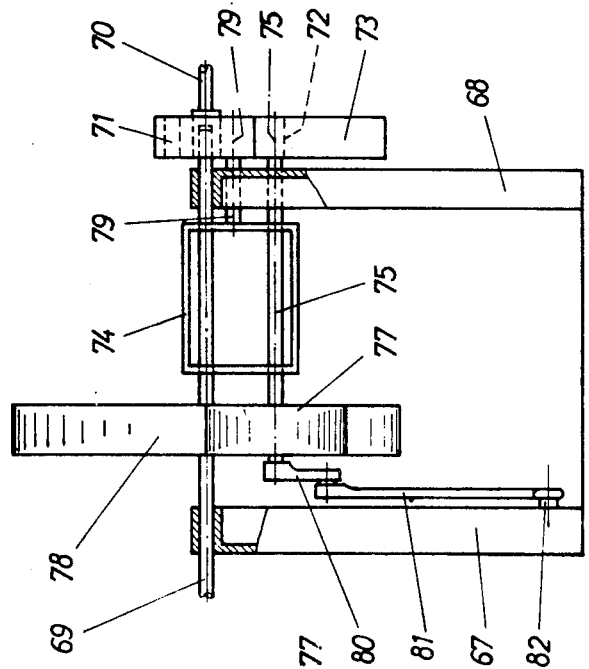
Figure 11:
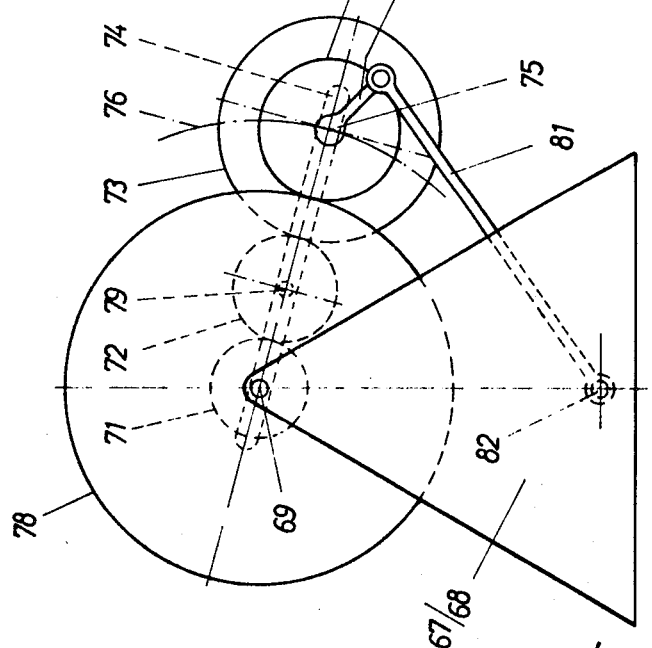
Figure 15:
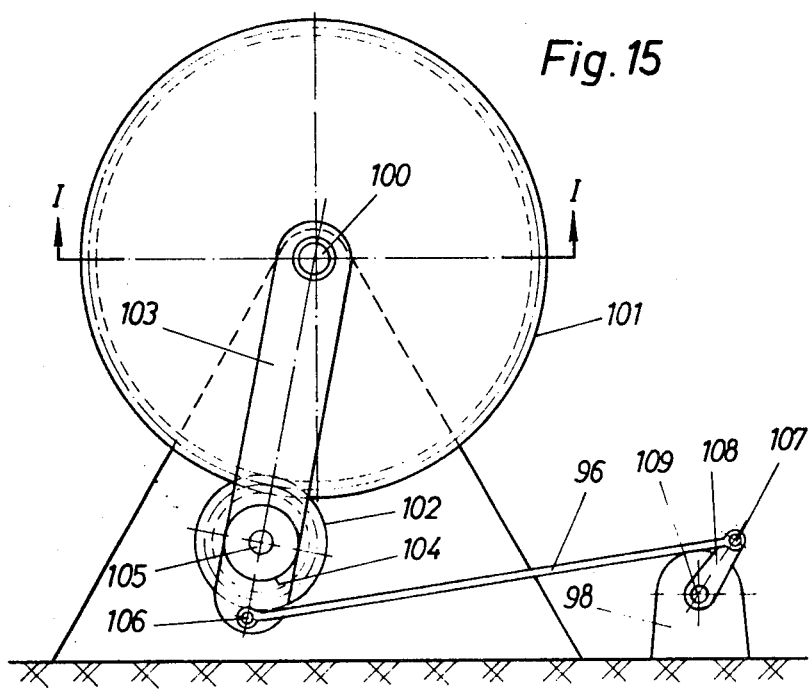
Figure 16:
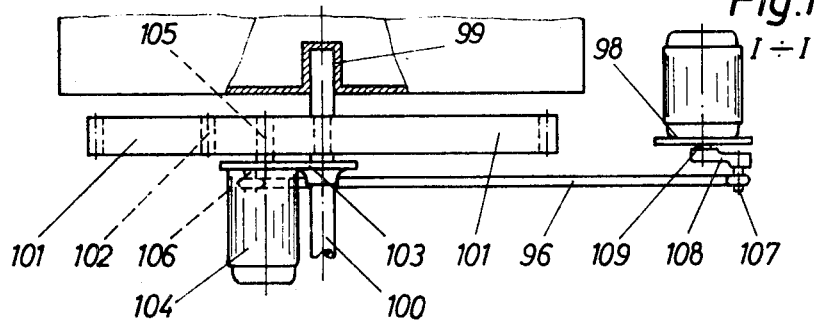
Figure 17:
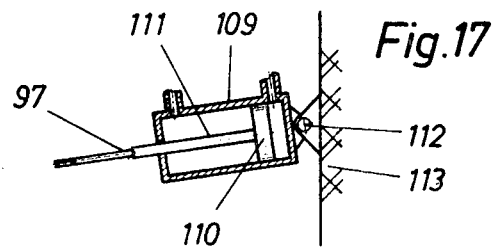

The invention will be further described, purely by way of example, with reference to the accompanying formal drawings, in which:

FIG. 1 is a schematic side view of a gear in accordance with the present invention, FIG. 2 is an end view of the gear of FIG. 1 with the housing open and partially cut away, FIG. 3 is a graph of the speed characteristic of the gear in accordance with the invention, FIG. 4 is a schematic side view of a slightly modified embodiment of the gear of FIG. 1, FIG. 5 is a schematic side view of the gear of FIG. 4 with the housing in section, FIG. 6 is a schematic side view of a further modified gear having a chain or belt drive, FIG. 7 is a schematic end view of the gear of FIG. 6 with the housing in section, FIG. 8 is a schematic end view of a gear with the housing in section, having a coaxial drive and power take-off, FIG. 9 is a schematic side view of the gear of FIG. 8, FIG. 10 is a schematic side view of a modified embodiment of the gear of FIG. 9, FIG. 11 is a schematic side view of a gear as shown in FIGS. 1 and 4 but provided additionally with a coaxial drive and power take-off, FIG. 12 is a schematic end view of the gear shown in FIG. 11, FIG. 13 is a schematic side view of a further embodiment of a gear having mutually displaceable pedestal bearings adapted to receive a driving shaft or driven shaft, FIG. 14 is a schematic end view of the gear of FIG. 13 with the gear boxes in section, FIG. 15 is a schematic end view of a further embodiment of the gear having an externally located crank rod and a gear setting motor, FIG. 16 is a schematic sectional plan view taken along the line I—I in FIG. 15, FIG. 17 is a schematic fragmentary view of the crank rod gear of FIG. 16, slightly modified, FIG. 18 is a schematic side view of a further embodiment of the invention showing a worm gear, FIG. 19 is a schematic plan view of the gear shown in FIG. 18, FIG. 20 is a schematic end view of a further embodiment of the invention showing an epicyclic gear, FIG. 21 is a schematic plan view of the gear of FIG. 20 having the upper part of the housing removed, a part of the gear being a section along the line II—II of FIG. 20, FIG. 22 is a schematic end view of a further embodiment of an epicyclic gear, FIG. 23 is a schematic plan view of the gear of FIG. 22 with the upper part of the housing removed and is a section taken along the line III—III of FIG. 22.

The gears are only shown schematically in most of the figures so as to make their function comprehensible. In principle, however, they are identical with the structure shown in FIGS. 1 and 2 and vary only in minor constructional details.

In FIGS. 1 to 7, the driven shaft is denoted by 10 and the crank part of the driving shaft is denoted by 11. The driven shaft 10 is rotatably mounted in journal bearings 12, 13 or may alternatively be provided with roller bearings on a pedestal 14. A coupling (not shown) for connecting a machine to be driven may be provided on the shaft 10.

A gear box 17 is rotatably mounted on the driven shaft 10 by means of bearings 15, 16. This gear box 17 accommodates a gear means such as a gear wheel, chain wheel or pulley 18 which is rigidly connected to the driven shaft 10. Bearings 19, 20 for the driving shaft 11 are located on the gear box 17, which bearings have a predetermined clearance from the mounting of the shaft 11. Within the gear box 17, the shaft carries a gear means 21 which co-operates with the gear means 18.

In the embodiment of FIGS. 1 to 5 the gear means 18, 21 are gear wheels, whilst in the embodiment of FIGS. 6 and 7, they are chain wheels or pulleys.

As shown in FIG. 2, the gear box 17 is connectable by means of a clutch 25 to an electric motor 22 having an intermediate or additional gear 23. Any other motor may be provided as an alternative to the electric motor 22 and the additional gear 23.

The driving shaft 24 of the intermediate gear engages with the driving shaft 11 by means of the clutch 25. At the opposite side of the gear box 17 the driving shaft 11 is provided with a crank arm 26 which can take any one of several forms such as a lever and bearing pin. This crank arm 26 rotatably engages with a crank rod 27, which is itself mounted on the pedestal bearing 14 so as to be rotatable about a bearing pin 28. The crank rod 27 also engages with a bearing pin in the crank arm 26.

FIG. 1 shows that the bearing pin 28 may be moved both laterally and vertically. In FIG. 1, the pedestal bearing is provided with additional engaging points 29, 30, 31 for the bearing pin 28. It is thus possible to vary the form of the speed changes on the driven shaft 10.

Furthermore, the crank rod 27 and the crank arm 26 are preferably so formed that they are of variable length and interchangeable, which permits the power take-off from the gear to be varied.

In the embodiment shown in FIG. 1, the gear wheels 18 and 21 are in direct engagement.

In FIG. 3 the characteristic of the gear according to FIGS. 1 and 2 is shown. The output shaft speed is shown on the ordinate 32 and the rotation of the driving gear wheel 21 through 360° is shown on the abcissa 33.

If the length of the crank arm 26 is one half the pitch circle diameter of the diameter of the driving gear 21, a substantially cosine-shaped curve 34 results. It can be seen that this curve 34 asymptotically approaches zero speed, and since for the purposes of the graphs the speed of the driving gear 21 is maintained constant, the driven shaft 10 is momentarily stopped periodically.

The result obtained when the crank arm 26 is longer than the value stated above, is shown by curve 35. It will be noted that this curve has steeper gradients, has a greater variation in speed from minimum to maximum, and also causes a reversal of the driven shaft 10.

Shortening the crank arm 25 to below the value stated above flattens the speed graph as shown by curve 36. As will soon be noted, the driven shaft 10 is not stopped at any stage.

It is pointed out that with the parts located as shown in FIG. 1, the curve shapes are substantially sine wave. When the bearing pin 28 is shifted and/or crank rod 27 is varied in length, the curve undulations are no longer symmetrical, so that any desired characteristics are obtainable.

In the embodiment shown in FIGS. 4 and 5, an additional speed translation is produced by an intermediate gear 37 which is rotatably mounted on an intermediate gear shaft 36 in bearings 39, 40 on the gear box 17. This provides a reversal of direction of rotation relative to the embodiment of FIG. 1. This gear is constructed like that shown in FIGS. 1 and 2 and presents the same possible variations.

To facilitate comprehension of the subject matter and to avoid unnecessary repetition, components which differ only slightly from the first embodiment, for example, the gear box, have been given the same reference numerals as in the first embodiment.

In the embodiment according to FIGS. 6 and 7 the gear means 18 and 21 are formed as chain wheels which are connected by a chain 41. It is also possible to provide a friction or toothed belt drive. In this case corresponding variations, such as explained with reference to FIG. 3 are possible. It should here be noted that in this embodiment a length of crank arm 26 equal to the clearance between driving shaft 11 and driven shaft 10 is impossible, as jamming would occur.

The embodiments of FIGS. 8 to 12 differ from the above described embodiments in that the driving shaft 42 and the driven shaft 43 are mounted coaxially with one another in the gear box 44. Both the driving gear wheel 45 and the driven gear wheel 46 have intermediate gear wheels 47, 48 associated therewith. Between the intermediate gear wheels 47, 48 a further two-stage gear 49 is arranged, the wheels of which are either, as shown in the drawings, mounted on a bush 50 on the driven shaft 43, or on a bush 51 with the intermediate gear 47, or are fixed on the intermediate gear shaft 52 with the intermediate gear 48. The driving motor is stationary. The driving shaft 42 is mounted in bearings 53, 54 and the driven shaft 43 in bearings 54, 55.

In place of mounting by means of the bush 40, a two-stage intermediate gear 49 may be provided in a separate gear box which is rotatably mounted on crank arms about shaft 43.

The intermediate gear shaft 52 is provided at its ends with crank arms 56, 57 and is suspended on crank rods 58, 59. The crank rods 58, 59 are mounted rotatably about the driving shaft 42 or the driven shaft 43 by means of bearings 60, 61. The arms 56, 57 which are cranked at their outer ends are provided with pins 62, 63 which are movably guided in slides 64, 65. These slides 64, 65 (FIG. 9) are straight and vertical. The axis intersects the coaxial line of the driving and driven shafts. In this arrangement there is a variation from the embodiment of FIG. 1) owing to the fact that both driving gear wheel 45 and driven gear wheel 46 are mounted in fixed bearings, and intermediate gear wheels 47, 48 are rotatably mounted about these shafts by crank rods 58, 59, which fulfil the object of the displaceable gear box 17 in FIGS. 1 and 2, whilst the intermediate gear shaft 52 is formed as a crank and moves with respect to the housing 44.

In FIG. 10 the slide 66, which corresponds to the slides 64, 65 in FIGS. 8 and 9, is arcuate or S-shaped. This allows irregular (non-sinusoidal speed) characteristics to be obtained. It should be understood that an inclined arrangement of the slide relative to the vertical is possible.

FIGS. 11 and 12 constitute a combination of the embodiments according to FIGS. 1 and 2, 4 and 5 and 8 and 9. The driven shaft 69 and the driving shaft 70 are coaxially mounted in pedestal bearings 67, 68 so that a stationary driving motor is provided. A pinion (gear wheel) 71 is fixed on the driving shaft 70. There is an intermediate gear train with gear wheels 72, 73 rotatably mounted about the driving shaft 70, the shafts thereof being mounted in a pivotal frame denoted by 74 in FIG. 11. The pivotal frame 74 is rotatable about one end of the driving shaft 70. The other end, in which the gear wheel 73 is mounted with its shaft 75, is rotatable about the driving shaft 70 along the arc 76. A gear wheel 77 is fixed on the shaft 75 and meshes with the driven gear wheel 78 which is mounted on the driven shaft 69.

The shafts 69 and 75 are interconnected by a torsion-resistant pivotal frame 74, which as shown in FIG. 12 is located between the pedestal bearings 67, 68. The shaft 79 for the intermediate gear 72 leads out of this frame.

Shaft 75 is formed as a crank at one end and provided with a crank arm 80 which is connected to the pedestal bearing 67 via a crank rod 81 with a pivot pin 82.

This embodiment has a pendulous intermediate gear oscillating about the driving and driven shafts, the speed characteristics obtained thereby being adjustable by varying the crank arm 80 or shifting the bearing pin 82 in a manner described in connection with FIG. 2. Optional torque transmissions and adjustments of direction of rotation may be produced by varying the various means as described.

A further embodiment is shown in FIGS. 13 and 14. Separate pedestal bearings 83, 84 are provided for a driven shaft 85 and a driving shaft 86. These pedestal bearings 83, 84 are displaceable towards or away from one another in the direction of the arrow 87. In this embodiment in an arrangement corresponding to FIGS. 1 to 5, gear boxes are provided; there is a gear box 88 rotatably mounted on the driven shaft 85 and a further gear box 89 rotatably mounted on the driving shaft 86. The gear wheels 90, 91 mounted on the driven and driving shafts and gear wheels 92, 93 mounted in the gear boxes 88, 89 are arranged on a common shaft 94, which at 95 is cranked between the gear boxes 88 and 89. This embodiment provides a power take-off with asymmetric speed characteristics extending with a constant drive speed. In the example, the crank 95 has a length which corresponds to the pitch circle diameter of the gear wheel 92, whereby the speed characteristic of the driven shaft 85, according to the graph 34 in FIG. 3 passes through zero, so that a periodical momentary halt of the driven shaft is obtained. By varying the length of the crank 95 changes of speed characteristic may be brought about as explained with reference to FIG. 3.

FIGS. 15 to 17 show an embodiment in which, in contrast to the embodiments described above, a crank rod 96, 97 is connected to the gear box and an external adjusting motor 98 is provided as supplementary drive for the stepping impulses.

The gear shown on the driven shaft 100 mounted in fixed bearings 99 has a gear wheel 101 with which a driving pinion 102 meshes. This driving pinion 102 is mounted in a pivotal frame which is rotatable about the driven shaft 100. A driving motor 104 the shaft of which forms the driving shaft 105 is mounted on the pivotal frame 103. The driving shaft 105 is pivotally retained relative to the gear wheel 101. A pivotal movement is effected by the crank rod 96 which at one end is mounted at 106 on the pivotal frame 103 and at the other end at 107 on a crank 108 on the driven shaft 109 of the motor 98.

It is obvious that uniform drive of the pinion 102 causes a pivotal movement of the driving shaft 105 about the driven shaft 100 to give an acceleration or a deceleration, whereby depending upon the relative speeds of the driving motor 104 and the adjusting motor 98 a periodical reversal of direction or instantaneous stopping of the driven shaft 100 is obtainable. The use of the adjusting motor 98 with crank 108 is particularly suitable for constant periodic steps.

According to FIG. 17 the speed varying or adjusting motor consists of a pressure medium cylinder 109 driven hydraulically, in which a piston 110 is reciprocated. The piston rod 111 extends into the crank rod 97. In this embodiment the cylinder 109 is pivotal on a base 113 in the plane of the pivotal frame 103 by means of the bearing 112.

The embodiment of FIG. 17 has the advantage that by controlling the piston movement the flanks of the individual step characteristics may be suitably shaped.

It is obvious that adjustment is readily possible by displacing the pivotal movement at 106 in a longitudinal direction of the pivotal frame 103, by altering the length of the crank rod 96, 97, or by varying the length of the crank arm 108. The crank rod 96, 97 is adjustably located on the pivotal frame 103. Furthermore supplementary intermediate gear means may be arranged between the driving shaft 105 and the driven shaft 100, when the driving gear wheel 102 is movable in the peripheral direction relative to the gear wheel 101.

In FIGS. 18 and 19 a further embodiment is shown which has a crank rod 114 located outside the actual gear, and an external speed adjusting motor is not used. On the driven shaft 115, which is mounted in stationary bearings 116, 117, there is a worm wheel 119 located within a housing 118, associated with a worm 120. The worm shaft is the driving shaft 121 having a driving motor 122 at one end and at the other end a crank arm 123. The crank arm 123 may be formed as a disc to provide mass balance.

On the crank arm 123 there is a bearing 124 for a universal joint 125, which at the other end is connected to the crank rod 114. This crank rod 114 is secured at the other end to an abutment 127 by means of a universal joint 126.

In the example shown, the universal joint 126 is mounted on the abutment 127 of an abutment part which in its normal position is axially aligned with the driving shaft 121. As shown in FIG. 18, the driven shaft 115 is driven at constant speed. To cyclically vary the speed, the universal joint 126 is moved in the direction of the double arrow 128 in a plane normal to the driven shaft 115. During rotation of the crank arm 123, an acceleration or a deceleration of the driven shaft 115 is obtained. Thus, by suitable adjustment a rise and fall of speed or even a reversal of direction may be obtained on the output shaft.

Adjustment of the speed characteristic is provided in that the bearing 124 is adjustable along the crank arm 123 and/or the crank rod is made of varying length.

The embodiment of FIGS. 18 and 19 also provides a ready adjustment of the flanks of the speed graph of individual undulations, by providing a lateral adjustment of the universal joint 126 at the abutment part, outside the plane normal to the driven shaft 115 through the driving shaft 121. Thus, a continuous adjustment may be provided by locating the universal joint 126 on a crank, the pivot pin of which is located in the plane through the driving shaft 121 normal to the driven shaft 115.

In FIGS. 20 to 23 embodiments using epicyclic gears are shown. Herein both the driving and the driven shafts are located in stationary bearings and in the embodiment a shaft may be selected as a driven or driving shaft depending upon requirements. The shaft 129 is a driving shaft which is mounted in stationary bearings 131 in the housing 130. The bearing is denoted by 131. A central rotatable sun wheel 132 is provided on the driving shaft 129. Planetary wheels 133, 134 (in the examples only two planetary wheels are shown, although it is also possible to use more planetary wheels) mesh with the sun wheel 132.

To obtain a speed transmission variation the planetary wheels are rigidly connected with coaxial gear wheels 135, 136, which have a different diameter and in turn mesh with a fixed gear wheel. This gear wheel is fashioned as an outer gear ring 137 (FIG. 21) arranged on the housing, or an inner gear ring 138 (FIG. 23) located around the bearing 131. The groups of planetary wheels 133, 135, 134, 136 are connected by a cage 139 which is rotatably arranged on the bearing 131. In known epicyclic gears this cage is used to rotate the other shaft, for example, the driven shaft. A feature of the invention resides in that this cage 139 is freely rotatable.

The planetary wheels 133, 134 are provided with eccentric crank pins 140, 141. These crank pins 140, 141 are arranged symmetrically relative to one another with regard to the individual planetary wheels, as shown in FIGS.

20 and 22. This symmetry relates to the arrangement in a peripheral direction, with radial clearance from the axles 142, 143 of the planetary wheels 133, 134, 135, 136. The arrangement is adjustable in a radial direction. FIGS. 20 and 22 show that an arrangement horizontally symmetrical is provided by the driving shaft 129. The other shaft denoted in the example as driven shaft 144 carries a crank arm fixed thereto which in the example shown in FIGS. 21 and 22 comprises two crank arms 145, 146 one for each crank pin 140, 141.

To this extent the embodiments according to FIGS. 20 and 21 and 22 and 23 are identical. In the embodiment according to FIGS. 20 and 21, crank rods 147, 148 are connected to the crank arms 145, 146, which in turn are connected to the crank pins 140, 141. To vary the speed characteristic the bearings 149, 150 of the crank rods 147, 148 may be adjustable in a longitudinal direction. Furthermore, the crank rods 147, 148 are made to be longitudinally variable or replaceable by others of varying length.

When the crank pins 140 and 141 are arranged on the pitch circle diameter of the planetary wheels 133, 134, driving steps result in which the driven shaft comes momentarily to a standstill. With a shaft outside or within the pitch circle diameter, either a reversal of direction is obtained in the working steps, or pulsating rotation of the driven shaft always in the same direction.

In the embodiment of FIGS. 22 and 23 the crank arms 145, 146 have radially directed slides 151, 152 in which blocks 153, 154 in the shape of rollers are in engagement over the crank pins 140, 141. This embodiment offers possibilities of varying the individual flanks of the speed graph when the block guides 151, 152 are arcuate instead of straight. Furthermore, it is understood that in the embodiment shown in FIGS. 22 and 23 a change of characteristic can be brought about by radial adjustment of the crank pins 140, 141, as already described in the previous paragraph.

In all embodiments the gear wheels may be variable or the gear wheels may be replaced by friction drives.

It is pointed out that features of individually described gears may be combined. Reference is specifically made to the fact that one crank arm of a pivotal shaft is related to the pitch circle diameter of the driving wheel of a series connected gear train and that the crank arms are variable in length.

I claim:
1. A stepping gear comprising a housing, a driving shaft coaxially mounted for rotation in said housing, a sun gear secured to said drive shaft, planetary gear means including at least two planetary gears disposed in meshing engagement with said sun gear, annular gear means secured to said housing and disposed in meshing engagement with said planetary gear means, each of said planetary gear means having a crank pin disposed eccentrically with respect to the axis of rotation of the planetary gear and adjustable coupling means drivingly connecting said crank pins to said driven shaft.

2. A stepping gear as set forth in claim 1 wherein said coupling means includes a pair of opposed radially directed arms secured to said driven shaft.

3. A stepping gear as set forth in claim 2 wherein said coupling means further comprises additional crank pins secured to each of said arms and connecting rod means pivotally secured between the crank pins on said planetary gears and the additional crank pins on said arms.

4. A stepping gear as set forth in claim 3 wherein said additional crank means are radially adjustable on said arms and said connecting rod means are adjustable in length.

5. A stepping gear as set forth in claim 2 wherein radially directed slideway means are provided on each of said arms, said coupling means including projections secured to said crank pins and disposed in sliding engagement in said slideway means.

6. A stepping gear as set forth in claim 1 wherein said planetary gear means includes a cage freely rotatable about the driving shaft and carrying said planetary gears.

References Cited

UNITED STATES PATENTS

| | | | |
|---|---|---|---|
| 2,787,001 | 4/1957 | Stilwell | 74—52X |
| 3,190,251 | 6/1965 | Kumpf | 74—394X |
| 3,232,132 | 2/1966 | Kawamura et al. | 74—394 |
| 3,508,451 | 4/1970 | Yoshida et al. | 74—394 |

LEONARD H. GERIN, Primary Examiner

U.S. Cl. X.R.

74—52